United States Patent
Lysen et al.

(10) Patent No.: US 6,784,986 B2
(45) Date of Patent: Aug. 31, 2004

(54) DEVICE AND PROCESS FOR ALIGNMENT OF MACHINE SHAFTS

(75) Inventors: Heinrich Lysen, Garching (DE); Dieter Busch, Ismaning (DE)

(73) Assignee: Pruftechnik Dieter Busch AG, Ismaning (DE)

(*) Notice: Subject to any disclaimer, the term of this patent is extended or adjusted under 35 U.S.C. 154(b) by 0 days.

(21) Appl. No.: 10/147,305

(22) Filed: May 17, 2002

(65) Prior Publication Data

US 2003/0055536 A1 Mar. 20, 2003

(51) Int. Cl.[7] ................. G01B 11/26; G01B 13/18; G01C 3/08; G01C 15/00
(52) U.S. Cl. ................. 356/152.2; 33/286; 33/412; 356/4.01; 356/153
(58) Field of Search ................. 356/152.2, 153, 356/4.01; 33/412, 286

(56) References Cited

U.S. PATENT DOCUMENTS

| | | | |
|---|---|---|---|
| 4,033,042 A | | 7/1977 | Bently |
| 4,283,688 A | * | 8/1981 | Lloyd et al. |
| 4,463,438 A | | 7/1984 | Zatezalo et al. |
| 4,698,491 A | * | 10/1987 | Lysen |
| 4,709,485 A | * | 12/1987 | Bowman |
| 4,864,148 A | * | 9/1989 | Lysen et al. |
| 5,026,998 A | * | 6/1991 | Holzl |
| 5,056,237 A | | 10/1991 | Suanders |
| 5,077,905 A | * | 1/1992 | Murray |
| 5,691,523 A | | 11/1997 | Calvo |
| 5,896,672 A | | 4/1999 | Harris |
| 6,040,903 A | * | 3/2000 | Lysen et al. ................. 356/153 |
| 6,434,849 B1 | * | 8/2002 | Hermann |

FOREIGN PATENT DOCUMENTS

EP 0 145 745 B1 6/1985

* cited by examiner

*Primary Examiner*—Stephen C. Buczinski
(74) *Attorney, Agent, or Firm*—Nixon Peabody LLP; David S. Safran

(57) ABSTRACT

A device for aligning two machine shafts which are coupled to one another has:

- at least one laser light source for emitting laser light;
- at least one reflector for reflecting the laser light;
- at least one receiving device for receiving the laser light;
- a first arithmetic computing device for determining parallel and angular offset of the machine shafts; and
- an evaluation and arithmetic computing device for determining the distance of the machine mounting elements relative to the plane of symmetry which lies between the machine shafts. The plane of symmetry intersects the axes of the machine shafts essentially perpendicular to longitudinal axes of the shafts, i.e. with an angular error of less than 6°.

14 Claims, 4 Drawing Sheets

DEVICE AND PROCESS FOR ALIGNMENT OF MACHINE SHAFTS

BACKGROUND OF THE INVENTION

1. Field of the Invention

The invention relates to a device for alignment of machine shafts.

2. Description of Related Art

A device for aligning machine shafts is known from U.S. Pat. No. 4,463,438, inventor Zatezalo. The device of this patent calls for the use of mechanical measurement means. Accordingly, the attainable accuracy in the alignment of machine shafts is limited and depends on various mechanical boundary conditions, for example, on the slack of the measurement means.

A similar device with much improved accuracy is described in European Patent EP 0145745 of Lysen. Instead of mechanical measurement indicators, EP 0145745 calls for those based on a laser beam. In this way, the utility of shaft alignment instruments was radically enhanced. Overall, the microelectronics and measurement methods provided in each case enabled computer-aided, accurate and much more comfortable alignment of measurement shafts than had been possible in the past. However, to date, the innovative devices of this type have had the disadvantage that various activities must be performed manually before or after the actual measurement process. This relates especially to the input of various parameters, such as, for example, dimension data which must be input manually into the pertinent computer system. Another manual activity consists in manually converting the computed correction values, i.e., shifting or calibrating at least one machine in three directions of space, for which in part a certain expenditure of force is necessary. Although there are suggested solutions for the latter problem, so far there has not been any solution for automating and making more efficient the initial inputting of machine dimensions. This invention solves this special problem.

SUMMARY OF THE INVENTION

According to the invention, a device for aligning two machine shafts which are coupled to one another has:

- at least one laser light source for emitting laser light
- at least one reflector for reflecting the laser light
- at least one receiving device for receiving the laser light
- a first arithmetic means for determining parallel and angular offset of the machine shafts
- an evaluation and arithmetic means for determining the distance of the machine mounting elements relative to the plane of symmetry which lies between the machine shafts and which intersects the axes of the machine shafts essentially vertically.

Typically, there are two separate laser light transmitting and receiving means, specifically, one for determining the amounts of offset on the shafts, and one for determining the distances of the machine mounting elements among one another or relative to a plane of symmetry which lies between the machine shafts. In one special embodiment of the invention, there is only a single laser light transmitting and receiving means which is used alternately for the indicated determinations of amounts and distances.

Characteristic of the invention is the procedure of automatically supplying the electronically determined distances between the machine mounting elements to the computing process for determining the correction values with which the displacement values are computed using which optimum alignment of the participating machines and machine shafts can be achieved. Accordingly, it is possible to combine the indicated first arithmetic unit and the indicated evaluation and arithmetic means for determining the distance from the machine mounting elements in a single electronic circuit. This electronic circuit can be functionally connected to a single operating surface (as the output device) and a single input device. In this way, it is now possible to carry out the measurement process which was carried out manually in the past for determining dimensions with computer support, by which the inadvertent introduction of measurement error is clearly reduced and the alignment measure is simplified overall.

The invention is suitable for use in alignment devices with different designs. These alignment devices can therefore provide a single laser beam for determining the amounts of shaft offset, or two separate laser beams.

In the indicated determination of distances on an electronic basis, to some extent, triangulation processes or transit time measurements can be used. In transit time measurements, comparatively simple reflectors which are located on likewise simply designed stands can be used.

The invention is explained in detail below with reference to the accompanying drawings.

DETAILED DESCRIPTION OF THE INVENTION

Figure 1:
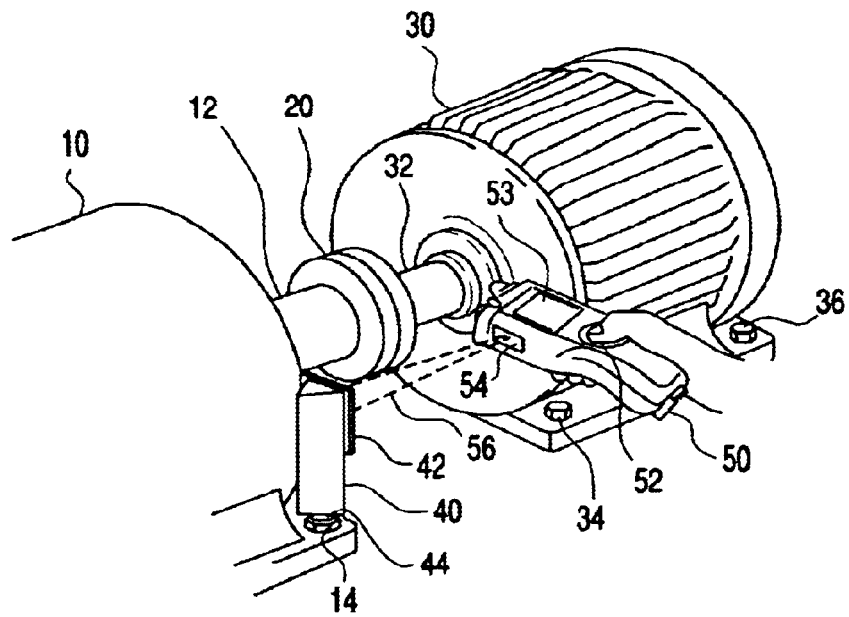
FIG. 1 is a perspective view of a mobile device in accordance with the invention for automatic input of distance data into the shaft alignment system.

As is shown in FIG. 1, the invention calls for optical measurement means, as described, for example, in U.S. Pat. No. 4,463,438, with which the distances are automatically recorded. Two machines 10, 20 can be installed in a desired position by means of bolts and nuts 14, 34, 36, etc. on a mounting plane. To position the machines in the vertical direction, shims can be used, as are conventionally known, but are not identified in detail in the drawings. The shafts 12, 32 of the machines 10, 20 are dynamically connected by means of a coupling; their lengthwise axes should be coaxially identical to prevent wear and machine damage.

Figure 7:
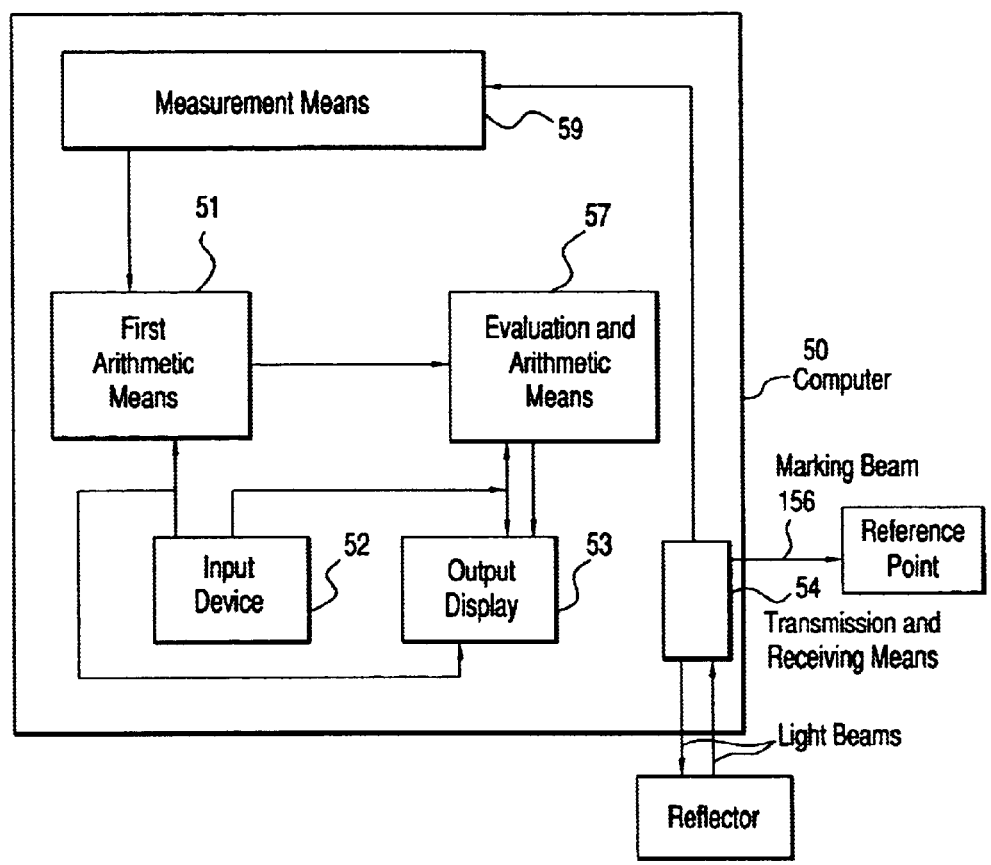
FIG. 7 shows, schematically, the portable computer components.

In the preferred embodiment of the invention as shown in FIG. 1, there is a portable computer 50 with a input device 52 and a display 53, and in its main function, it interrogates mechanical or optical measurement means 59 (shown in FIG. 7) for determining the translational and angular offset of the machines 10, 30. The portable computer 50 combines a first arithmetic unit 51, which receives information from the mechanical or optical measurement means 59 and determines the parallel and angular offset of the machine shaft (12,32), and an evaluation and arithmetic means 57 which determines the distance from the machine mounting elements (14, 16, 34 or 36) in a single electronic circuit. This electronic circuit can be functionally connected to a single operating surface, for example, the output display 53, and a single input device, for example the input device 52. In this way, it is now possible to carry out the measurement process, which had previously been carried out manually, for determining dimensions from a computer support to thereby reduce the inadvertent introduction of measurement error while the overall alignment measure is simplified. From the measurement values which have been determined in this way, the desired correction data are computed, with which the machines can be moved into ideal position, if misalignment should be present. It is shown in FIG. 1 how the relevant machine dimensions are recorded by means of the computer 50. To do this, there is an optically acting transmission and receiving means 54. With it light beams 56 are sent to a reflector 42. The light beams reflected by the reflector 42 are recorded by the receiving means. Either by means of transit time measurement or by triangulation, is it possible to determine the distance between the computer 50 and the reflector 42 in a relatively accurate manner.

Figure 2:
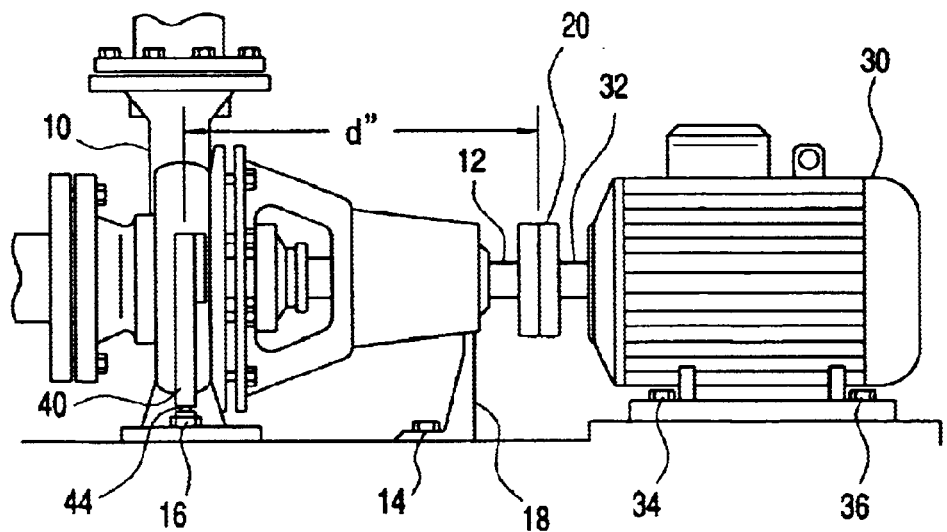
FIG. 2 is a side view of two machines and a measurement means in a first measurement position.
Figure 3:
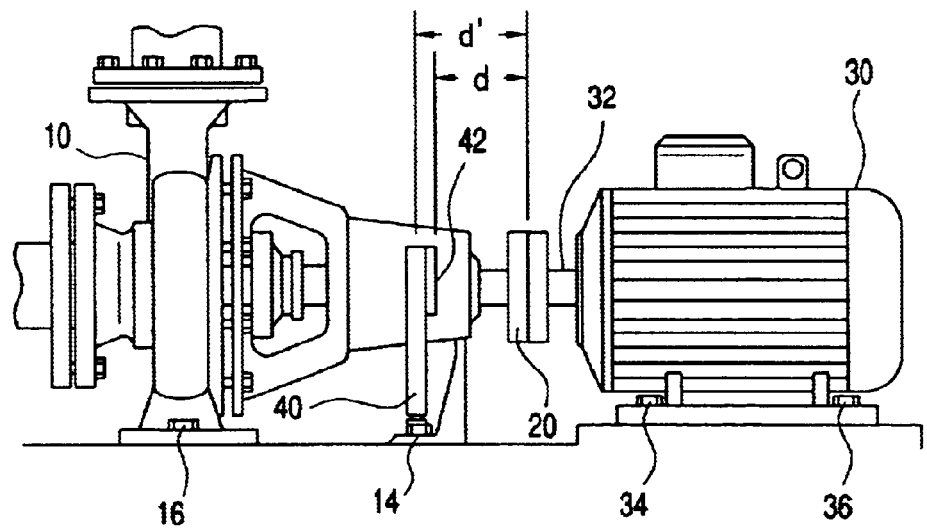
FIG. 3 is a side view of two machines and a measurement device in a second measurement position.

As shown in FIG. 1, the lengthwise axis of the computer 50 is aligned manually to the center plane of the coupling 20 since the important reference plane is defined by this center plane. Depending on the optical measurement processes used, the reflector 42 can be produced in different technology. Normally, it has diffuse reflection behavior so that its orientation relative to the computer 50 is not critical. To position the reflector 42, there is a stand 40 of suitable length. The stand 40 can be equipped with magnetic foot 44, but it can also be set up directly on the mounting plane which belongs to the machine. Therefore, the reflector 42 can be manually positioned such that the axis of symmetry of the stand 40 comes to rest parallel to the lengthwise axis of the nut 14 or of the respective bolt. After completed distance measurement (for which the computer 50 together with its transmitting and receiving means 54 is used), the reflector 42 can be moved from one measurement position into the next for subsequent measurement (c.f. FIGS. 2 & 3). Typically, four such distance measurements can be taken and stored in the memory of the computer for further alignment measures.

To take the distance measurement, the computer 50 has an input device 52 and a viewing screen 53. The input device can be a conventional keyboard, or can be implemented by means of a single knob selection device. It is advantageous to equip the computer with a user interface on an alphanumeric, graphic or acoustic basis. The operator can execute the varied measurement tasks in succession in a convenient manner and depending on given or selectable partitions.

FIG. 2 shows how the stand 40 is positioned above the mounting nut 16 for the measurement of the distance d". In a comparable manner, FIG. 3 shows how the stand 40 is positioned above the mounting nut 14 which is assigned to the machine foot 18 for measurement of the distance d'. The computer software can be designed such that the optically determined distance d is automatically converted into the underlying distance d' if this is necessary and the reflector 42 is not aligned to the mounting nut 14 anyway.

Figure 4:
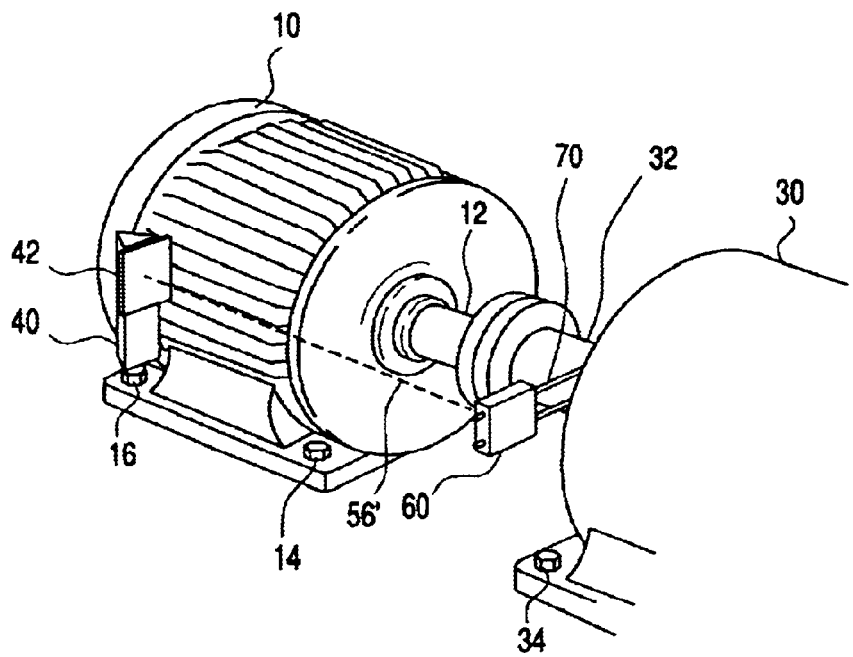
FIG. 4 is a perspective view of temporarily mounted measurement means for automatic input of distance data into the shaft alignment system
Figure 5:
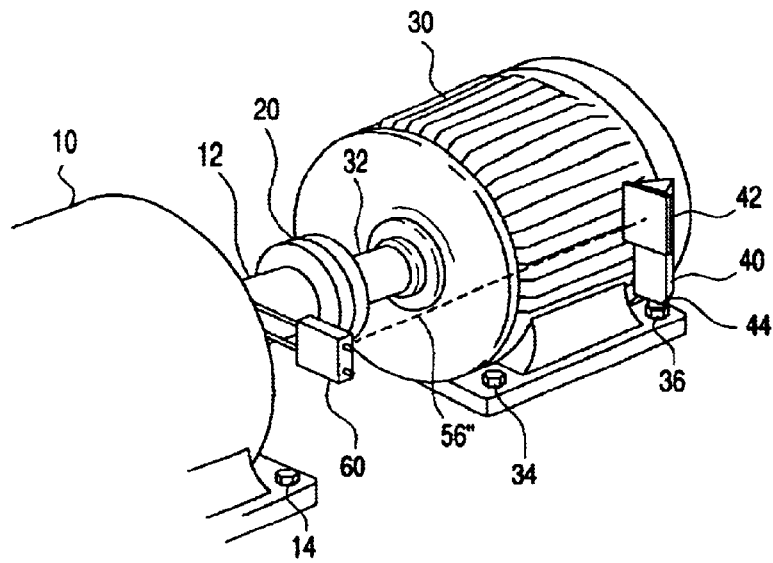
FIG. 5 is a view comparable to FIG. 4, the measurement means being located in a different measurement position

FIG. 4 shows an alternative embodiment of the invention. Here, to measure distances, there is a light beam 56' which is produced by a laser light source 60. This light source can be the same as is used mainly for measuring the radial and angular offset of the shaft pieces 12, 32 (the pertinent receiving device or reflector not shown). Before the measurement data are recorded with respect to the amount of shaft offset, the laser light source, in interplay with the pertinent receiving device (not shown in FIGS. 4 & 5), takes a distance measurement so that the pertinent distances between the center of the coupling and the mounting screws 14, 16 can be recorded, or equivalent dimensional data which differ by a constant. Therefore, pulsed light is sent to the reflector 42, the reflected light is sensed with a high-speed photodetector, and based on the transit time, the distance to the reflector 42 is determined electronically. As shown, the laser light source 60 is temporarily mounted on the shaft 32 with a conventional clamping device 70.

After two first measurements with respect to the position of the mounting nuts 14, 16, the laser light source 60 is re-clamped or changed and is then used for distance measurement with respect to the mounting nuts 34, 36. This is shown, for example, in FIG. 5; the respective laser light beam is identified with reference number 56".

For the case in which a measurement system is used which works with two laser beams which work independently of one another, two laser light sources can thus be used. They can be turned against one another for purposes of distance measurement on their respective shaft pieces 12, 32 and then are used in interplay with not only an individual, but with respective separate reflectors 42.

Figure 6:
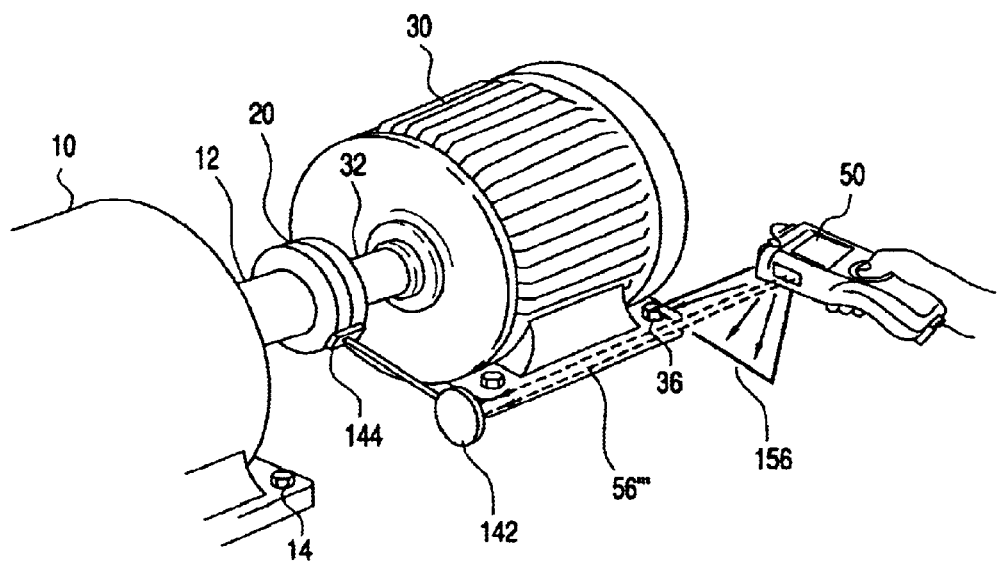
FIG. 6 shows another embodiment of the invention with a symmetrically arranged reflector.

FIG. 6 shows another embodiment of the invention which is characterized by a symmetrically located reflector 142, which need not be changed or repositioned during the individual distance measurements. Preferably, reflector 142 has two reflection surfaces that are located back to back. Reflector 142 is arranged such that the two reflection surfaces essentially coincide with the central coupling plane which vertically intersects the axes of the participating machines. For this purpose, there is advantageously a magnetic holder 144 together with an associated stand rod. The stand rod can be advantageously lengthened or shortened in the manner of a telescope. However, also other stand arrangements can be used, for example, those which are set up on the floor of the building. As is shown in FIG. 6, the computer 50 is moved in the direction of a machine axis until its coordinate value in this respect agrees with that of the machine foot to be measured or the respective mounting screw or bolt. From this position, then, the distance between the computer 50 and the first reflection side of the reflector 142 is optically measured, as is illustrated by the indicated light beam 56". This measurement process is repeated for the coordinates of interest.

Measurement can be facilitated and can be carried out with better precision when the computer has a transmitter for a marking beam 156. The light beams which produce this marking fix a plane which is oriented essentially perpendicular to the measurement beam 56". As soon as the marking beam 156 illuminates, for example, the axis of the mounting screw 36 and the measurement beam 56" can hit the reflector, the computer 50 is correctly positioned except for small residual errors.

What is claimed is:

1. Device for aligning two machine shafts which are coupled to one another, comprising:
  at least one laser light source for emitting laser light;
  at least one reflector for reflecting the laser light;
  at least one receiving device for receiving the laser light;
  a first arithmetic unit for determining parallel and angular offset of the machine shafts;

an evaluation and arithmetic means for determining a distance of machine mounting elements relative to a plane of symmetry which lies between the machine shafts to be aligned and which perpendicularly intersects longitudinal axes of the machine shafts; and means for producing a reference point location marking for positioning of said device relative to said plane.

2. Device as claimed in claim 1, wherein the first arithmetic computing device is adapted to determine at least one of parallel and angular offset of the machine shafts with automatic use of measured values which provided by the evaluation and arithmetic computing device.

3. Device as claimed in claim 2, wherein said evaluation and arithmetic computing device is adapted to measure distance by determining the transit time of light.

4. Device as claimed in claim 2, wherein said evaluation and arithmetic computing device is adapted to measure distance by triangulation.

5. Device as claimed in claim 1, wherein said at least one laser light source is separate from said at least one receiving device.

6. Device as claimed in claim 1, wherein said at least one reflector is mounted on a stand which is adapted to be manually positioned in the vicinity of a machine mounting element.

7. Device as claimed in claim 1, wherein said at least one reflector comprises a single reflector which is adapted for use in both determining amounts of offset of the machine shafts and also in determining the distances of the mounting elements of the machines relative to said plane of symmetry.

8. Device as claimed in claim 1, wherein a common operating surface is provided for both the first arithmetic computing device and for the evaluation and arithmetic computing device.

9. Process for alignment of machine shafts, which includes the following steps:

providing an optical laser alignment system;

providing an optical distance measuring system;

providing a reflector of the optical distance measuring system in the vicinity of machine mounting elements;

obtaining data relating to the distance between the machine mounting elements and a plane which is located symmetrically between the machine shafts on an optoelectronic basis;

obtaining measurement data relating to parallel offset of the shaft and angular offset of the shafts computing correction values with which displacement of the machine can be performed for purposes of producing complete alignment of the shafts;

wherein said step of providing an optical distance measuring system comprises producing of a reference point location marking for positioning of said device relative to said plane.

10. Process as claimed in claim 9, wherein the correction values are computed automatically with at least the following data:

the distance data and the measurement data based on the shaft offset.

11. Process for alignment of machine shafts, which includes the following steps:

providing an optical laser alignment system;

providing an optical distance measuring system;

positioning of a reflector of the optical distance measuring system in the vicinity of a machine coupling;

obtaining data relating to the distance between machine mounting elements and a plane which is located symmetrically between the machine shafts on an optoelectronic basis;

obtaining measurement data relating to parallel offset and angular offset of the shafts; and computing correction values with which displacement of the machine be performed for purposes of producing complete alignment of the shafts;

wherein said step of providing an optical distance measuring system comprises marking a reference point location for positioning of said device relative to said plane.

12. Process as claimed in claim 11, wherein the correction values are computed automatically using at least the following data:

the distance data and the measurement data based on shaft offset.

13. Device for executing the process as claimed in claim 11, wherein said reflector comprises a reflector device having reflective surfaces on opposite sides thereof.

14. Device for executing the process as claimed in claim 11, wherein the optical distance measuring system and the optical laser alignment system are located in a common housing.

* * * * *